(12) United States Patent
Irwan et al.

(10) Patent No.: US 10,965,713 B2
(45) Date of Patent: Mar. 30, 2021

(54) CENTRALLY MANAGING DATA FOR ORCHESTRATING AND MANAGING USER ACCOUNTS AND ACCESS CONTROL AND SECURITY POLICIES REMOTELY ACROSS MULTIPLE DEVICES

(71) Applicant: Xage Security, Inc., Palo Alto, CA (US)

(72) Inventors: Susanto Junaidi Irwan, San Francisco, CA (US); Roman M. Arutyunov, San Jose, CA (US); Andy Sugiarto, Moraga, CA (US); Ganesh B. Jampani, Gilroy, CA (US); Bao Q. Ngo, San Jose, CA (US)

(73) Assignee: XAGE SECURITY, INC., Palo Alto, CA (US)

( * ) Notice: Subject to any disclaimer, the term of this patent is extended or adjusted under 35 U.S.C. 154(b) by 156 days.

(21) Appl. No.: 16/391,125

(22) Filed: Apr. 22, 2019

(65) Prior Publication Data
US 2020/0177635 A1    Jun. 4, 2020

Related U.S. Application Data

(63) Continuation of application No. 16/209,547, filed on Dec. 4, 2018, now Pat. No. 10,326,802.

(51) Int. Cl.
*H04L 29/06* (2006.01)
*G06F 21/60* (2013.01)
(Continued)

(52) U.S. Cl.
CPC ............ *H04L 63/20* (2013.01); *G06F 21/604* (2013.01); *H04L 9/0637* (2013.01); *H04L 9/12* (2013.01);
(Continued)

(58) Field of Classification Search
None
See application file for complete search history.

(56) References Cited

U.S. PATENT DOCUMENTS 10,084,600 B1 * 9/2018 Irwan .................... H04L 9/3093
10,176,335 B2 * 1/2019 Adams ................ G06F 21/6218
(Continued)

OTHER PUBLICATIONS

Zwattendorfer et al. "A Federated Cloud Identity Broker-Model for Enhanced Privacy via Proxy Re-Encryption", 15th IFIP International Conference on Communications and Multimedia Security (CMS), Sep. 2014, Aveiro, Portugal. Springer Lecture Notes in Computer Science, LNCS-8735, pp. 92-103, 2014. (Year: 2014).*

(Continued)

*Primary Examiner* — Jeffery L Williams
(74) *Attorney, Agent, or Firm* — Hickman Becker Bingham Ledesma LLP

(57) ABSTRACT

In an embodiment, a computer-implemented method comprising: posting, by a broker computing device, device control data to a distributed datastore including distributed ledger and blockchain, wherein the device control data is collected at a plurality of directory services in a federation; receiving, at a computing hardware device, the device control data from the distributed datastore; using, by the computing hardware device, the device control data received from the distributed datastore, remotely managing user accounts and access control and security policies on at least one networked device.

20 Claims, 6 Drawing Sheets

(51) Int. Cl.
*H04L 29/08* (2006.01)
*H04L 9/12* (2006.01)
*H04L 9/06* (2006.01)
*H04L 9/32* (2006.01)

(52) U.S. Cl.
CPC .......... *H04L 9/3239* (2013.01); *H04L 63/102* (2013.01); *H04L 65/608* (2013.01); *H04L 67/025* (2013.01); *H04L 67/2809* (2013.01); *H04L 2209/38* (2013.01)

(56) References Cited

U.S. PATENT DOCUMENTS

| | | | | |
|---|---|---|---|---|
| 2014/0310243 | A1* | 10/2014 | McGee | G06Q 10/101 707/639 |
| 2016/0241403 | A1* | 8/2016 | Lindemann | H04L 63/0861 |
| 2016/0306966 | A1* | 10/2016 | Srivastava | G06F 21/31 |
| 2016/0330182 | A1* | 11/2016 | Jeon | H04L 63/062 |
| 2016/0358158 | A1* | 12/2016 | Radocchia | G07G 1/0081 |
| 2017/0177855 | A1* | 6/2017 | Costa Faidella | G06F 21/45 |
| 2017/0180211 | A1* | 6/2017 | Johnson | H04L 67/10 |
| 2017/0250972 | A1* | 8/2017 | Ronda | H04L 9/08 |
| 2017/0251025 | A1* | 8/2017 | Varley | H04L 9/3247 |
| 2017/0289134 | A1* | 10/2017 | Bradley | H04L 63/102 |
| 2017/0307387 | A1* | 10/2017 | Kohlhepp | G06Q 50/18 |
| 2017/0324738 | A1* | 11/2017 | Hari | H04L 61/2061 |
| 2018/0069899 | A1* | 3/2018 | Lang | H04L 63/20 |
| 2018/0083977 | A1* | 3/2018 | Murugesan | H04L 63/104 |
| 2018/0097802 | A1* | 4/2018 | Lander | H04L 63/0815 |
| 2018/0219862 | A1* | 8/2018 | Young | H04L 63/08 |
| 2018/0239897 | A1* | 8/2018 | Ventura | G06F 21/53 |
| 2018/0248845 | A1* | 8/2018 | Irwan | H04L 9/3239 |
| 2018/0260125 | A1* | 9/2018 | Botes | G06F 3/0617 |
| 2019/0013948 | A1* | 1/2019 | Mercuri | G06Q 20/02 |
| 2019/0044740 | A1* | 2/2019 | Smith | H04L 9/3278 |

OTHER PUBLICATIONS

Makkes et al.,"Defining Intercloud Federation Framework for Multi-provider Cloud Services Integration", The Fourth International Conference on Cloud Computing, GRIDs, and Virtualization (Cloud Computing 2013), p. 185-190. (Year: 2013).*

* cited by examiner

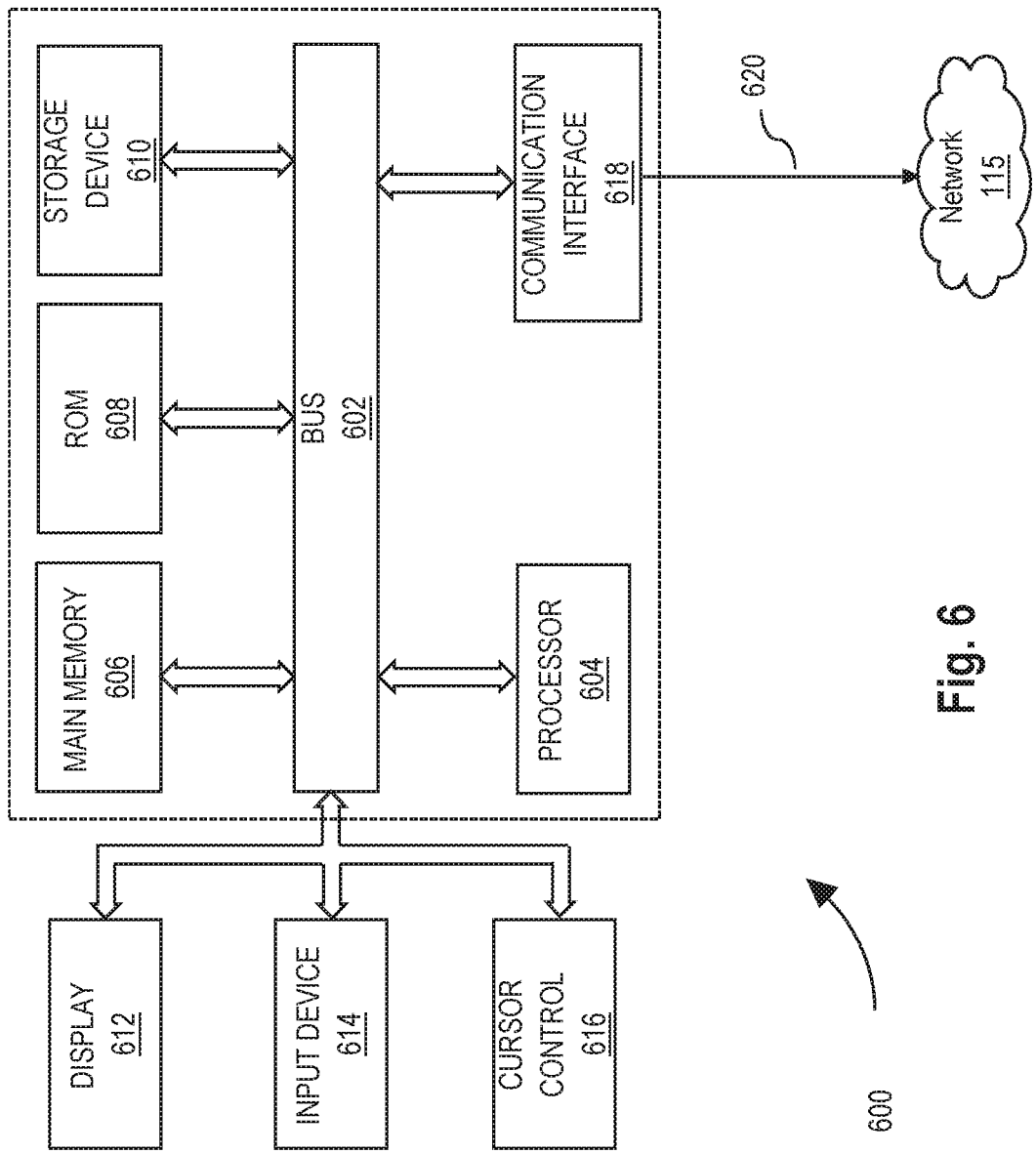

US 10,965,713 B2

CENTRALLY MANAGING DATA FOR ORCHESTRATING AND MANAGING USER ACCOUNTS AND ACCESS CONTROL AND SECURITY POLICIES REMOTELY ACROSS MULTIPLE DEVICES

BENEFIT CLAIM

This application claims the benefit under 35 U.S.C. § 120 as a Continuation of application Ser. No. 16/209,547, filed Dec. 4, 2018, the entire contents of which is hereby incorporated by reference for all purposes as if fully set forth herein.

TECHNICAL FIELD

One technical field of the present disclosure is methods, systems, computer software, and/or computer hardware in the field of access control for digital electronic devices. Another technical field is device access control services to prevent unauthorized access and use of devices. Still another technical field is controlling device access to networked devices, including internet of things (IoT) devices, and computer-implemented methods of improving the resistance of networked devices to attacks, unauthorized access, malicious use, or malware.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditionally, devices are manually configured with user accounts and access control and security policies to allow or to deny access by users. When a user account is added or removed or when a change in the access control and security policies occurs, these devices need to be individually configured again. However, this traditional approach is time and labor intensive, especially for an organization that has thousands of devices that multiple users or entities require access to.

The development and deployment of internet of things (IoT) devices has proceeded with remarkable speed in the past several years. IoT devices are diverse, including everything from controllers of industrial equipment to smart watches and personal activity monitors. However, security infrastructure has not kept pace with the huge number and wide use of these devices. Some analysts estimate that billions of such devices will be operating and connected to internetworks within a few years, but there is presently no effective security architecture that can efficiently permit IoT devices to be secured effectively, yet readily usable. Key constraints in this technical field have included limited processing power, limited memory, and limited or absent user interface elements. All these characteristics of IoT devices make them difficult to integrate into existing client-server security systems. At the same time, misuse of IoT devices could be catastrophic by permitting an attacker or unauthorized user to gain control of industrial equipment or other systems that have embedded IoT devices.

Thus, there is a need for an improved and efficient approach to configure devices without human intervention at each of these devices. There is also a need for a secure method of storing, managing, and accessing user accounts and access control and security policies that is tolerant of security breaches.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 illustrates an example block diagram of a computer system upon which an embodiment of the invention may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
2.0 STRUCTURAL OVERVIEW
3.0 FUNCTIONAL OVERVIEW
   3.1 BROKER
   3.2 BLOCKCHAIN OPERATIONS
   3.3 GATEWAY
4.0 PROCEDURAL OVERVIEW
5.0 HARDWARE OVERVIEW
6.0 OTHER ASPECTS OF DISCLOSURE

1.0 General Overview

According to various embodiments, computer-implemented methods and systems are provided that enable user accounts and access control and security policies to be centrally managed and distributed across numerous networked devices. Embodiments offer the benefit of not requiring human intervention at each networked device. Distributing centrally-managed user accounts and access control and security policies across numerous networked devices becomes efficient and can be updated quickly.

In an embodiment, a computer-implemented method comprises receiving, at multiple broker computing devices, device control data from a plurality of directory services in a federation. The method also comprises posting, by the broker computing devices, the device control data to a distributed datastore including distributed ledger and blockchain. The method also comprises receiving, at a computing hardware device, the device control data from the distributed datastore. The method also comprises, in response to receiving the device control data from the distributed datastore, remotely managing, by the computing hardware device, user accounts and access control and security policies on at least one networked device.

2.0 Structural Overview

Figure 1:
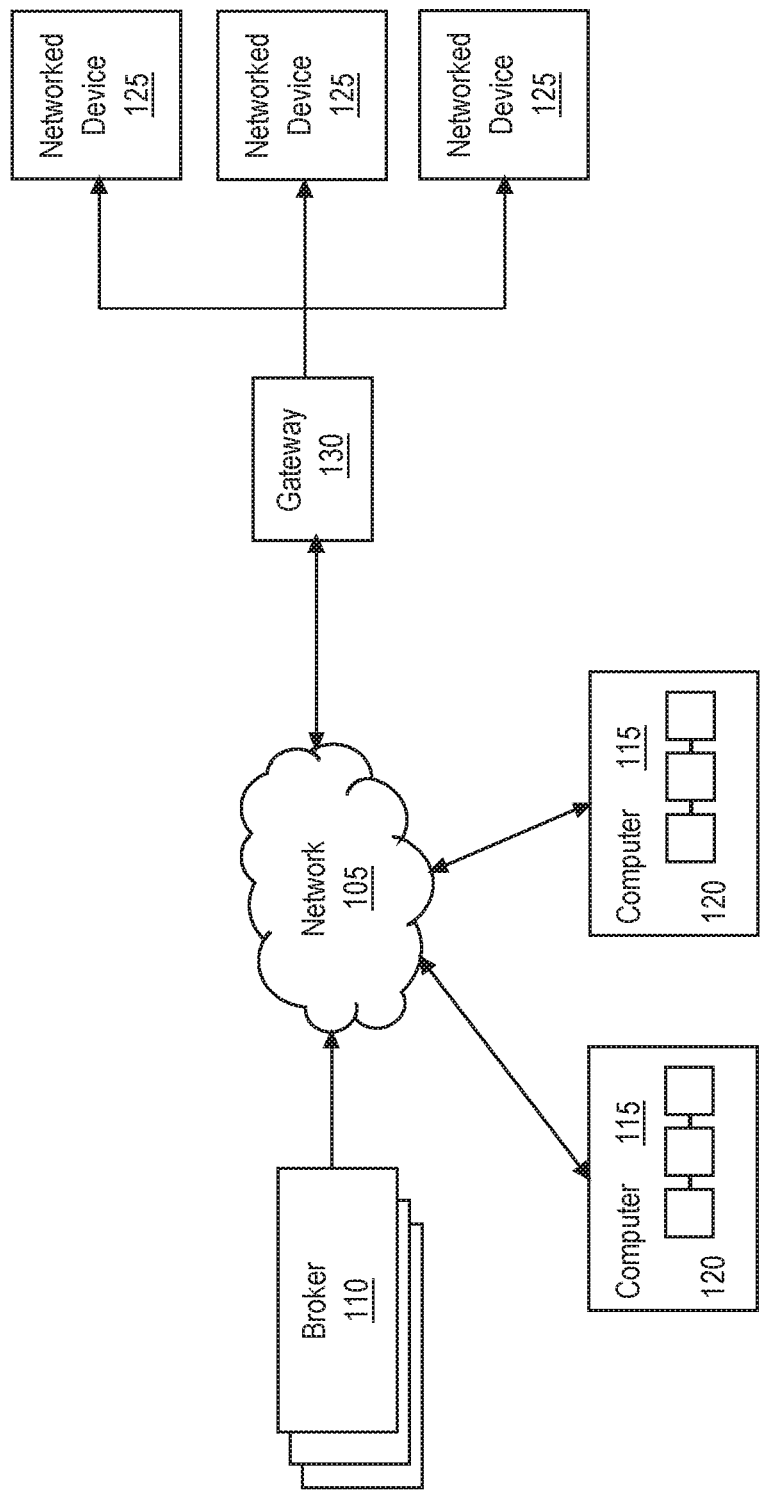
FIG. 1 illustrates an example networked computer system in accordance with some embodiments.

FIG. 1 illustrates an example networked computer system 100 in accordance with some embodiments. In some embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement.

In the example of FIG. 1, the networked computer system 100 may facilitate the secure exchange of data between programmed brokers 110, devices 115 of a blockchain, a gateway 130, and networked devices 125 that are directly accessible by users (not illustrated) and/or entities (not illustrated). In some embodiments, each of elements 110, 115, and 120 of FIG. 1 may represent one or more computers that host or execute stored programs that provide the functions and operations that are described further herein in connection with device access control services and blockchain operations.

A broker 110 may be a computer, software and/or hardware or a combination storing instructions that are programmed or configured to access, from one or more directory services, device control data, including but not limited to user accounts and access control and security policies. User accounts identify which users and networked device(s) 125 and/or applications thereon the users have access to. Access control policies specify the extent of access on the networked devices 125 and/or the applications thereon. Security policies specify software versions, user groups, password policies, password expiration dates, and the like.

A federation is a group of entities, such as directory services, agreeing upon standards of user accounts and access control and security policies in a collective fashion. This allows directory services to delegate collective authority over, for example, a networked device 125. In some embodiments, the broker 110 and other brokers 110 associated with the same federation, together, may generate hashes and encrypt all device control data from the directory services belonging in the same federation and send the information over a network 105 to a digital blockchain 120 data repository for storage, as further described herein. In this manner, all device control data is centrally managed by all brokers 110 associated with the same federation.

Network 105 broadly represents a combination of one or more wireless or wired networks, such as local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 105 and the disclosure presumes that all elements of FIG. 1 are communicatively coupled via the network 105. The various elements depicted in FIG. 1 may also communicate with each other via direct communications links that are not depicted in FIG. 1 for purposes of explanation.

The blockchain 120 may comprise blocks of linked data that are stored in an interconnected network of computers, with suitable stored programs at those computers to support ordered creation and transmission of blockchain data. The blockchain 120 forms a distributed database that maintains a continuously growing list of ordered records, termed blocks, that are timestamped and linked to a previous block. Each block in the series of blocks is linked together chronologically, with each new block containing a hash of the previous block. Each computer 115, or node, in a network of computers may store the entire record of linked data blocks. This creates a consensus network of computers that can verify the integrity of each block of data and the integrity of the entire blockchain 120. The consensus network has the benefit of having a high Byzantine fault tolerance, which is the ability of a computing system to tolerate Byzantine failures. As a result, the blockchain 120 functions as a distributed database that ensures the integrity of the data by utilizing hash functions to link each block to its previous block and storing the entire record of data blocks at each node.

Device access control services may be computer-implemented services that are programmatically offered by the gateway 130. The gateway 130 may be a computer, software and/or hardware or a combination storing instructions configured to access the device control data stored in the blockchain 120. For example, the gateway 130 may store a copy of the device control data in a local database by periodically checking the blockchain 120 for updated data. Using the device control data, the gateway 130 may orchestrate and manage accounts and policies on the networked devices 125. In some embodiments, the gateway 130 may also periodically update the blockchain 120 with locally stored and updated information to the device control data. The gateway 130 does not necessarily need to be co-located at the same site as any of the networked devices 125. The gateway 130 can be located anywhere in the internet as long as the gateway 130 is communicatively coupled with the networked devices 125. In some embodiments, the gateway 130 may access different blocks of the same blockchain or across different blockchains for different device control data for managing accounts on a different set of one or more networked devices. The device access control service is operating system agnostic and provides the device control data in a format digestible by networked devices running different operating systems.

A networked device 125 may be a computer, a virtual computer, and/or a computing device and may run any operating system. A computer may be one or more server computers, cloud-based computers, cloud-based cluster of computers, virtual machine instances or virtual machine computing elements such as virtual processors, storage and memory, data centers, storage devices, desktop computers, laptop computers, workstations (for example, Windows or Linux), mobile devices, and/or any other special-purpose computing devices. A computer may be used to control an industrial equipment, such as a wind turbine. A computer may be a part of an industrial equipment. The networked device 125 may be computer network devices such as gateways, modems, routers, wireless access points, switches, hubs, and firewalls. The networked device 125 may also be other IoT devices, which are physical devices with network connectivity capabilities that enables these physical devices to collect and exchange data. The networked device 125 may also be specific users using a computer or IoT device. The networked device 125 may also be applications running on a computer or IoT device. In some embodiments, the networked device 125 may already have local accounts set up and may be part of a domain associated with a directory service. However, the networked device 125 is not part of all domains associated with the different directory services in a federation.

3.0 Functional Overview

In some embodiments, all brokers 110 associated with a federation, the blockchain 120, and the gateway 130 interoperate programmatically in an unconventional manner to provide a device access control intermediary that, based on the device control data stored in the blockchain 120, continuously orchestrates and manages user accounts and access control and security policies remotely for the networked devices 125 via a communication protocol. In some embodiments, the gateway 130 may be programmed to accommodate a wide variety of different communication protocols, such as, for example, HTTP, Real Time Streaming Protocol (RTSP) over HTTP, Secure Socket Shell (SSH), Telnet, Windows Remote Management (WinRM), Operational Technology (OT) protocols such as MQTT, Modbus, and Object linking and embedding for Process Control Unified Architecture (OPC UA), or any other applicable protocol.

The brokers 110, the blockchain 120, and the gateway 130 are programmed to or configured to copy, encrypt, distribute, store, transport, and/or monitor the device control data in a secure manner so that the gateway 130 may manage device access controls using this data, as further described in other sections herein.

3.1 Broker

Figure 2:
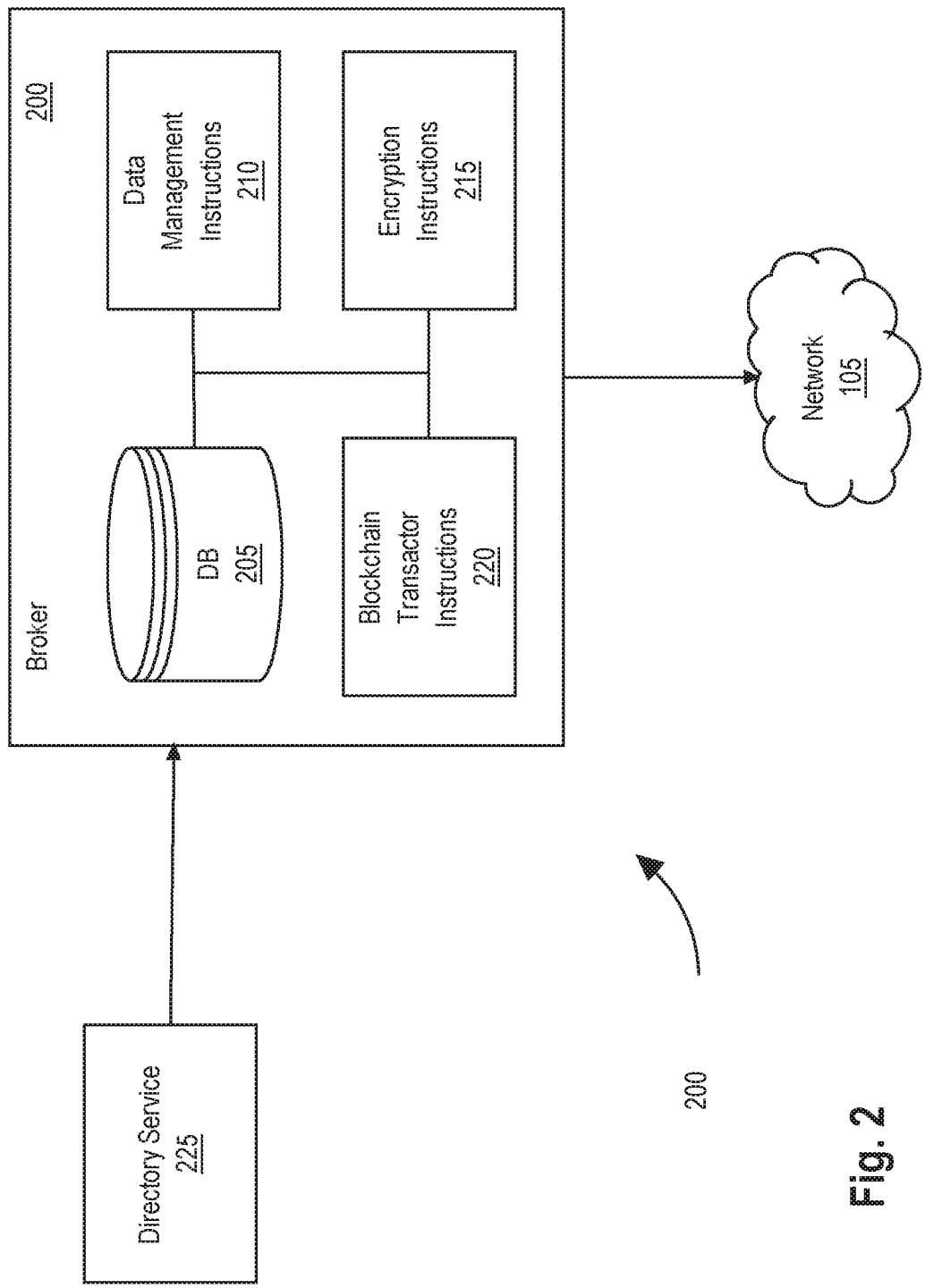
FIG. 2 illustrates an example broker in accordance with some embodiments.

FIG. 2 illustrates an example broker 200 in accordance with some embodiments. In some embodiments, the broker 110 of FIG. 1 is similarly configured as the broker 200. The broker 200 is associated with a federation. The broker 200 may use a database 205 to store the device control data retrieved from one or more directory services in the federation using data management instructions 210. In some embodiments, the broker 200 is a dedicated broker for a single directory service in the federation. In some embodiments, the broker 200 is one of a plurality of brokers associated with the federation.

In some embodiments, device control data from all brokers associated with the federation may be encrypted by encryption instructions 215. For example, the encryption instructions 215 may apply a hash algorithm, such as an MD5, Secure Hash Algorithm (SHA) 256, or any other hash function, to the device control data to generate one or more hashed or encrypted data object elements. The hash may act as a numerical representation of an object element. Any hash function, as understood in the art, may be used. Any changes to the object element would change the hash, thereby creating differences in the current hash compared to a previous hash.

The one or more encrypted object elements are then sent over the network 105 to the digital blockchain 120 data repository for storage using blockchain transactor instructions 220. The blockchain transactor instructions 220 update the digital blockchain 120 by creating one or more new blocks or entries in the blockchain 190.

3.2 Blockchain Operations

The blockchain 120 functions as a decentralized digital ledger that tracks numerous entries. Copies of the entire blockchain may be stored at each computer 115, or node, in a distributed network of interconnected computers of which FIG. 1 illustrates computer 115 with blockchain 120. In an embodiment, proposed entries to the blockchain 120 may be checked by a majority of the computers for verification. For example, if a new entry is generated for storage in the blockchain 120, the network of interconnected computers that also store copies of the blockchain 120 would first run algorithms to evaluate the hash value and verify the validity of the entry. If a majority of the computers agree that the entry is valid, then the entry will be added as a new block in the blockchain 120. As a part of a consensus network, blockchain 120 enforces high Byzantine fault tolerance; for example, a malicious attack attempting to alter the information in the blockchain 120 would need to control over 50% of the computers in the consensus network to alter the consensus. Since it would be exceedingly difficult to maliciously attack and maintain control over that many computers, the blockchain 120 data is better protected against malicious attacks than traditional methods of data storage.

Figure 3:
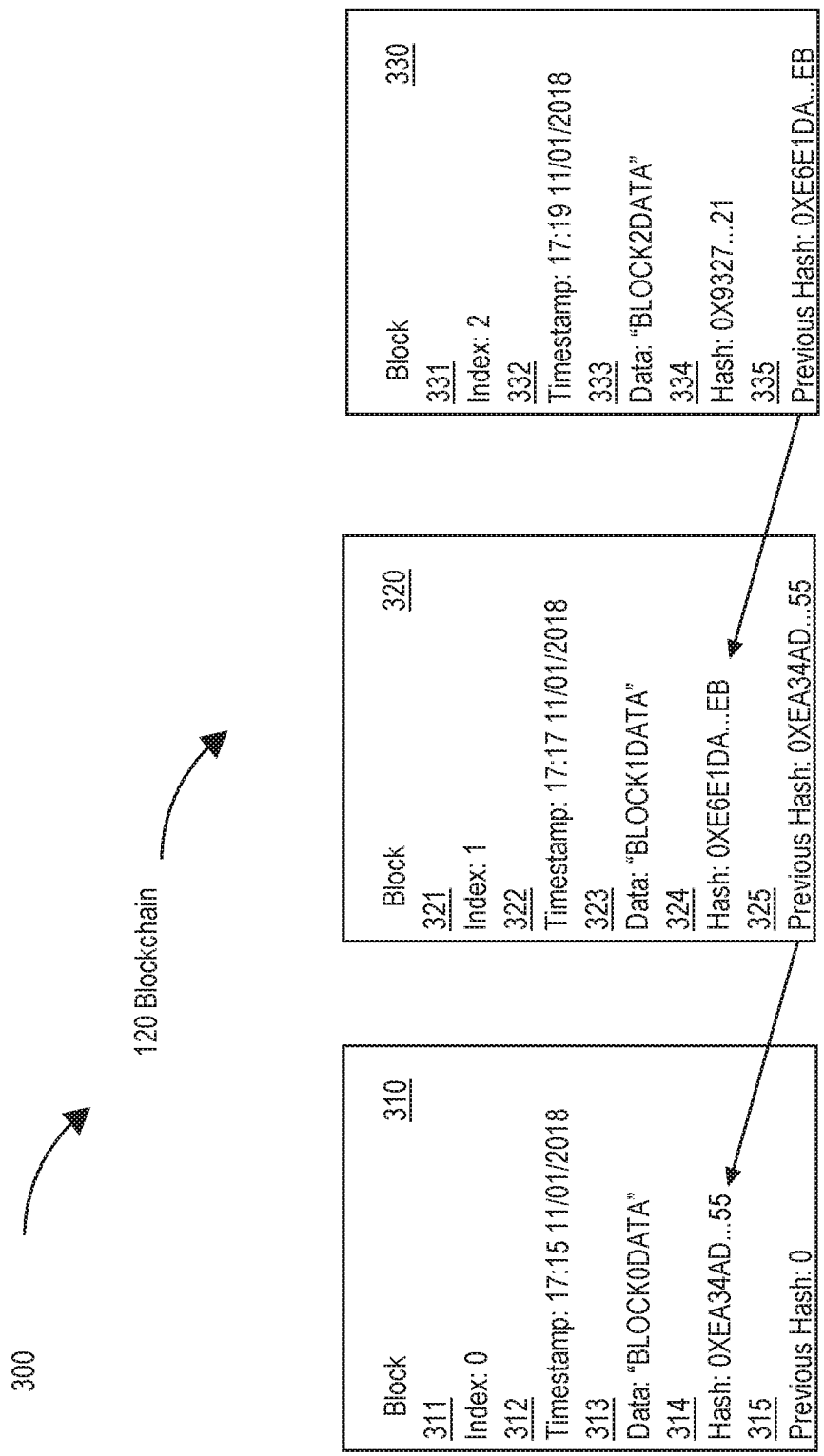
FIG. 3 illustrates an example digital distributed datastore in accordance with some embodiments.

FIG. 3 illustrates an example digital distributed datastore 300 in accordance with some embodiments. In an example embodiment, a digital distributed datastore 300 is a blockchain database. The blockchain database comprises the blockchain 120 having blocks 310, 320, 330. The blockchain 120 may include any number of blocks. In the example of FIG. 3, each block 310, 320, 330 may include its own index number 311, 321, 331, timestamp 312, 322, 332, data 313, 323, 333, hash 314, 324, 334, and previous hash 315, 325, 335.

The index number 311, 321, 331 may be a numerical index that indicates the block's placement in the chain. The timestamp 312, 322, 332 may be the date and time of when a block 310, 320, 330 is created. The data 313, 323, 333 may be an encrypted share stored as "block0data," "block1data," and "block2data" in the blocks 310, 320, 330, respectively. The hash 314, 324, 334 may be a hash of the encrypted rule or policy, such as an MD5 hash, SHA256 hash, or RIPEMD hash. The previous hash 315, 325, 335 may be the hash of the previous block, which links the blocks in sequence. In the example of FIG. 3, block 330 stores a record of previous hash 324, while block 320 stores a record of previous hash 314. These records of previous hashes link each new block to the previous block to form a chain that allows for integrity checks of each block.

3.3 Gateway

Figure 4:
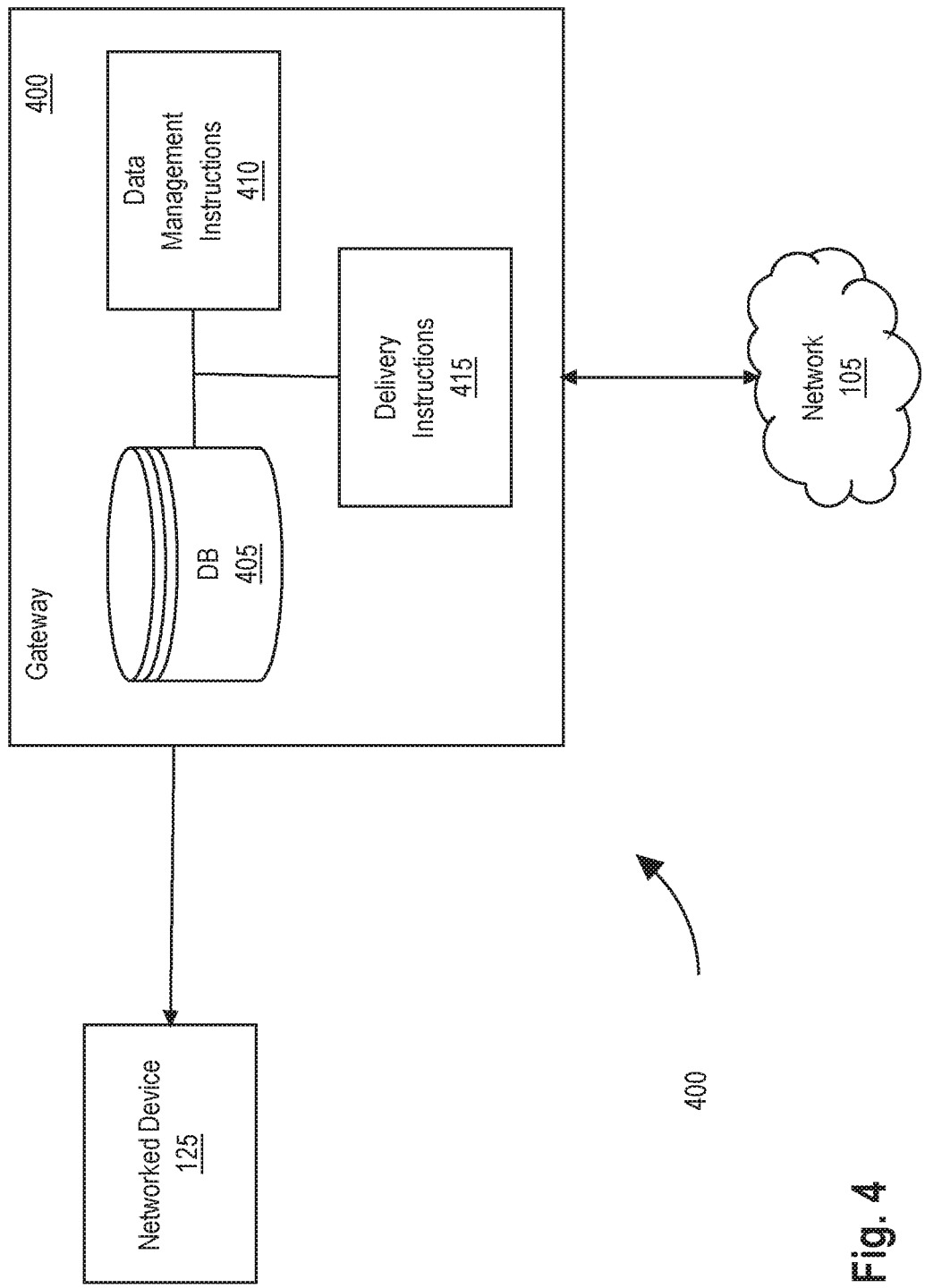
FIG. 4 illustrates an example gateway in accordance with some embodiments.

FIG. 4 illustrates an example gateway 400 in accordance with some embodiments. In some embodiments, the gateway 130 of FIG. 1 is similarly configured as the gateway 400.

The gateway 400, optionally, may have a database 405 that stores its corresponding device control data that is stored in the broker databases 205 in brokers 200 associated with the same federation and/or the blockchain 120. In some embodiments, data management instructions 410 may periodically check the blockchain 120 for data directly rather than using a local database for storage. Alternatively, the data management instructions 410 may periodically check the blockchain 120 for updated data and store the updated data in the local database 405. In some embodiments, the device control data and any changes to them may be hashed and encrypted and stored in the blockchain 120 by the gateway 400. The gateway 400 uses the device control data to manage accounts on the networked device 125. Delivery instructions 415 may transmit the device control data to the networked device 125.

The device control data may be distributed across multiple networked devices 125, removing the necessity to separately provide such information at each networked device and creating a frictionless experience. For example, the gateway 130 provides the device control data that is stored in the blockchain 120 to the networked devices 125, which uses the devices control data to enforce access to the networked devices 125. A technical benefit of this approach is that a newly deployed networked device may start enforcing accesses to and on it without manual configurations. Another technical benefit of this approach is that any change to the device control data takes effect across one more networked devices 125.

4.0 Procedural Overview

Figure 5:
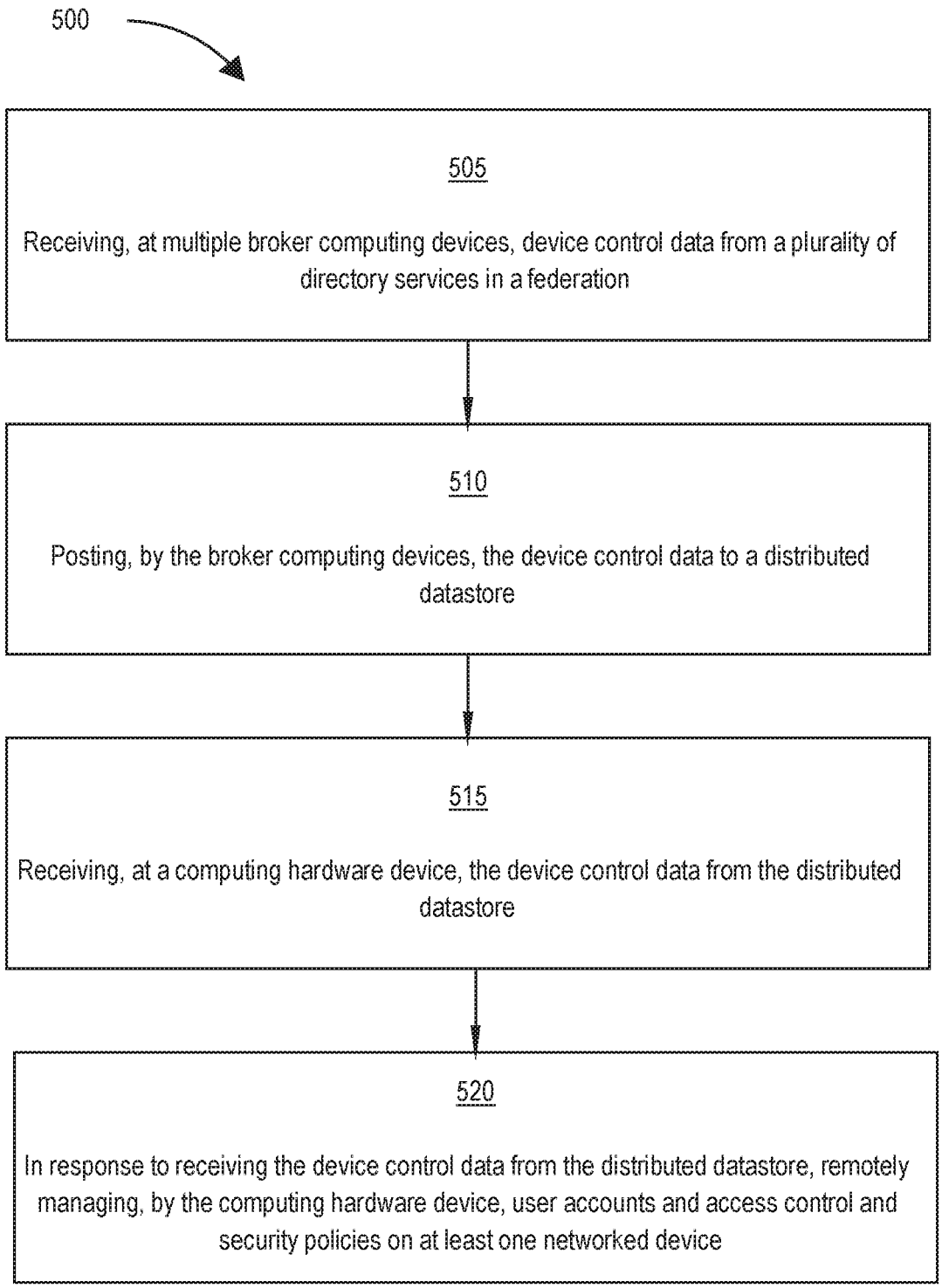
FIG. 5 illustrates an example method for providing device access control services in accordance with some embodiments.

FIG. 5 illustrates an example method 500 for providing device access control services in accordance with some embodiments. FIG. 5 may be used as a basis to code the method 500 as one or more computer programs or other software elements that the brokers 110 and/or the gateway 130 execute or host. For ease of discussion, the method 500 is described with reference to a single federation and a single gateway 130. However, it will be appreciated that the method 500 can be performed for multiple federations.

The method 500 begins at step 505, in which multiple broker computing devices receive device control data from a plurality of directory services in a federation. In some embodiments, each broker computing device is dedicated to one of the directory services in the federation for receiving therefrom the device control data that is stored by that directory service. In some embodiments, the device control data includes user accounts and access control and security policies. By receiving data from each and every one of the plurality of directory services in the federation, the broker computing devices collectively manage all device control data associated with the federation. Alternatively, or in addition to, the broker computing devices may define access control policies and/or security policies.

At step 510, the broker computing devices post the device control data to a distributed datastore. The distributed datastore may be a blockchain. In some embodiments, the broker computing devices collectively generate a hash and encrypt all device control data before posting to the distributed datastore. One manner in which this can be accomplished is by having one of the broker computing devices become the lead authority and the other broker computing devices provide their device control data to the leader. The leader would then approve which device control data is allowed to be committed to the distributed datastore and post the allowed or approved data as joint data to the distributed datastore. In some embodiments, there may be more than one leader and a policy requiring the multiple leaders to approve which device control data is allowed to be committed to the distributed datastore before posting the allowed data as joint data to the distributed datastore. In such a scenario, approval can be based on a multi-signature model. Another manner in which this can be accomplished is by having each broker computing device append its data in an order defined by an identifier, such as its network interface's MAC address, when posting to the distributed datastore. In this case, the last broker computing device would post the joint data to the distributed datastore. The communication between the broker computing devices may use a secure transport protocol. Alternatively, each of the broker computing devices separately generates a hash and encrypts its device control data before posting to the distributed datastore.

At step 515, a computing hardware device receives the device control data from the distributed datastore. The computing hardware device may be a dedicated gateway hardware device, a computing hardware device running gateway software, or another computing hardware device with network connectivity. In some embodiments, the computing hardware device periodically polls the distributed datastore for new data. In some embodiments, the computing hardware device retrieves the latest block collectively written to the blockchain by the broker computing devices. In some embodiments, the computing hardware device retrieves the latest blocks individually written to the blockchain by the broker computing devices.

At step 520, in response to receiving the device control data from the distributed datastore, the computing hardware device uses the device control data to remotely manage the user accounts and access control and security policies on at least one networked device. In some embodiments, the device control data is transmitted from the computing hardware device to the networked device using HTTP, Real Time Streaming Protocol (RTSP) over HTTP, Secure Socket Shell (SSH), Telnet, Windows Remote Management (WinRM), Operational Technology (OT) protocols such as MQTT, Modbus, and Object linking and embedding for Process Control Unified Architecture (OPC UA), or any other applicable protocol. In some embodiments, the computing hardware device may translate the user accounts and access control and security policies from an operating system agnostic format to a format digestible by the networked device. For example, on a networked device running UNIX, the gateway will update the /etc/password file with user accounts and the /etc/group file with the access control and security policies.

The networked device, thereafter, enforces user access requests according to the user accounts and access control and security policies on the networked device. In some embodiments, a plurality of network devices is synchronized with the device control data is the blockchain.

Using the foregoing techniques, programmed computers may centrally manage device control data associated with each federation and distribute the device control data to a plurality of networked devices, including IoT devices. The present approach utilizes a dedicated broker for each directory service in the federation to receive therefrom device control data and, together with other dedicated brokers associated with the federation, send all of the received device control data to a blockchain. Subsequently, the gateway retrieves the device control data from the blockchain and, thereby, orchestrates and manages user accounts and access control and security policies remotely on the plurality of networked devices. Each networked device enforces user accesses to it according to the user accounts and access control and security policies. Implementations provide for a centrally managing authority of data and eliminate challenges of maintaining synchronization of configurations across numerous networked devices. The scalable and distributed nature of a blockchain allows user accounts and access control and security policies across complex federations to be configured or updated across numerous networked devices, without individually configuring each networked device by an administrator.

Furthermore, the approaches disclosed herein improve data security and data integrity. The use of a blockchain protects the integrity of any data stored in the blockchain. The nature of the blockchain also ensures that each new block of data is linked to the previous block, creating an improved method of documenting changes and rejecting unapproved changes. Consequently, the blockchain functions as a secure backup for sensitive awareness data with high Byzantine fault tolerance.

It will be apparent from the disclosure as a whole that the purpose and character of the disclosure is directed to practical applications of computer technology in the form of programs, processes, messaging techniques, data storage techniques and the like that provide improvements in computer security for distributed networked devices, especially IoT devices that historically have not provided independently managed access control facilities. For industrial sites, government and military sites, for example, large networks of IoT devices now can be subject to more efficient access control, distribution and recordkeeping for access control data than has been possible before.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

FIG. 6 illustrates an example block diagram of a computer system 600 upon which an embodiment of the invention may be implemented. Computer system 600 includes a bus 602 or other communication mechanism for communicating information, and a hardware processor 604 coupled with the bus 602 for processing information. The hardware processor 604 may be, for example, a general-purpose microprocessor.

The computer system 600 also includes a main memory 606, such as a random-access memory (RAM) or other dynamic storage device, coupled to the bus 602 for storing information and instructions to be executed by the processor 604. The main memory 606 also may be used for storing temporary variables or other intermediate information during execution of instructions to be executed by the processor 604. Such instructions, when stored in non-transitory storage media accessible to the processor 604, render the computer system 600 into a special-purpose machine that is customized to perform the operations specified in the instructions.

The computer system 600 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions.

The computer system 600 may be coupled via the bus 602 to a display 612, such as a cathode ray tube (CRT), a liquid crystal display (LCD), or any other display for displaying information to a computer user. An input device 614, including alphanumeric and other keys, is coupled to the bus 602 for communicating information and command selections to the processor 604. Another type of user input device is cursor control 616, such as a mouse, a trackball, or cursor direction keys for communicating direction information and command selections to the processor 604 and for controlling cursor movement on the display 612. This input device typically has two degrees of freedom in two axes, a first axis (for example, x) and a second axis (for example, y), that allows the device to specify positions in a plane.

The computer system 600 may implement the techniques described herein using customized hard-wired logic, one or more ASICs or FPGAs, firmware and/or program logic which in combination with the computer system causes or programs the computer system 600 to be a special-purpose machine. According to one embodiment, the techniques herein are performed by the computer system 600 in response to the processor 604 executing one or more sequences of one or more instructions contained in the main memory 606. Such instructions may be read into the main memory 606 from another storage medium, such as the storage device 610. Execution of the sequences of instructions contained in the main memory 606 causes the processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as the storage device 610. Volatile media includes dynamic memory, such as the main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise the bus 602. Transmission media can also take the form of acoustic or light waves, such as those generated during radio-wave and infra-red data communications.

Various forms of media may be involved in carrying one or more sequences of one or more instructions to the processor 604 for execution. For example, the instructions may initially be carried on a magnetic disk or solid state drive of a remote computer. The remote computer can load the instructions into its dynamic memory and send the instructions over a telephone line using a modem. A modem local to the computer system 600 can receive the data on the telephone line and use an infra-red transmitter to convert the data to an infra-red signal. An infra-red detector can receive the data carried in the infra-red signal and appropriate circuitry can place the data on the bus 602. The bus 602 carries the data to the main memory 606, from which processor 604 retrieves and executes the instructions. The instructions received by the main memory 606 may optionally be stored on the storage device 610 either before or after execution by the processor 604.

The computer system 600 also includes a communication interface 618 coupled to the bus 602. The communication interface 618 provides a two-way data communication coupling to a network link 620 that is connected to a network, such as the network 115 of FIG. 1. For example, the communication interface 618 may be an integrated services digital network (ISDN) card, cable modem, satellite modem, or a modem to provide a data communication connection to a corresponding type of telephone line. As another example, the communication interface 618 may be a local area network (LAN) card to provide a data communication connection to a compatible LAN. Wireless links may also be implemented. In any such implementation, the communication interface 618 sends and receives electrical, electromagnetic or optical signals that carry digital data streams representing various types of information.

The network link 620 typically provides data communication through one or more networks 115 to other computing systems. The computer system 600 can send messages and receive data, including transaction data, through the network 115, the network link 620 and the communication interface 618.

6.0 Other Aspects of Disclosure

In the foregoing specification, embodiments of the invention have been described with reference to numerous specific details that may vary from implementation to implementation. Thus, the sole and exclusive indicator of what is the invention and, is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method comprising:
    posting, by a broker computing device, device control data to a distributed datastore including distributed ledger and blockchain, wherein the device control data is collected at a plurality of directory services in a federation;
    receiving, at a computing hardware device, the device control data from the distributed datastore;
    using, by the computing hardware device, the device control data received from the distributed datastore, remotely managing user accounts and access control and security policies on at least one networked device.

2. The method of claim 1, further comprising, after remotely managing user accounts and access control and security policies on at least one networked device:
    enforcing, by the at least one networked device, user accesses to the at least one networked device according to the user accounts and access control and security policies.

3. The method of claim 1, wherein remotely managing comprises transmitting the device control data to the at least one networked device.

4. The method of claim 3, wherein transmitting the device control data comprises using HTTP, Real Time Streaming Protocol (RTSP) over HTTP, Secure Socket Shell (SSH), Telnet, or Windows Remote Management (WinRM).

5. The method of claim 1, wherein the at least one networked device includes at least two networked devices, and further comprising:
    managing the at least two networked devices such that the at least two networked devices are synchronized.

6. The method of claim 1, wherein the computing hardware device is configured with gateway functionalities.

7. The method of claim 1, wherein the device control data includes user accounts and access control and security policies.

8. One or more non-transitory computer-readable storage media storing one or more sequences of program instructions which, when executed by one or more computing devices, cause:
    posting, by a broker computing device, device control data to a distributed datastore including distributed ledger and blockchain, wherein the device control data is collected at a plurality of directory services in a federation;
    receiving, at a computing hardware device, the device control data from the distributed datastore;
    using, by the computing hardware device, the device control data received from the distributed datastore, remotely managing user accounts and access control and security policies on at least one networked device.

9. The one or more non-transitory machine-readable media of claim 8, further comprising instructions that, when executed by the one or more computing devices, cause:
after remotely managing user accounts and access control and security policies on at least one networked device, enforcing, by the at least one networked device, user accesses to the at least one networked device according to the user accounts and access control and security policies.

10. The one or more non-transitory machine-readable media of claim 8, wherein remotely managing comprises transmitting the device control data to the at least one networked device.

11. The one or more non-transitory machine-readable media of claim 10, wherein transmitting the device control data comprises using HTTP, Real Time Streaming Protocol (RTSP) over HTTP, Secure Socket Shell (SSH), Telnet, or Windows Remote Management (WinRM).

12. The one or more non-transitory machine-readable media of claim 8, wherein the at least one networked device includes at least two networked devices, and further comprising instructions that, when executed by the one or more computing devices, cause:
managing the at least two networked devices such that the at least two networked devices are synchronized.

13. The one or more non-transitory machine-readable media of claim 8, wherein the computing hardware device is configured with gateway functionalities.

14. The one or more non-transitory machine-readable media of claim 8, wherein the device control data includes user accounts and access control and security policies.

15. A computer system comprising:
a distributed datastore including distributed ledger and blockchain data repository;
a broker computing device communicatively coupled with the distributed datastore, wherein the broker computing device comprises a first non-transitory data storage medium storing a first set of instructions which, when executed by the broker computing device, cause:
posting device control data to the distributed datastore including distributed ledger and blockchain data repository, wherein the device control data is collected by a plurality of directory services in a federation;
a computing hardware device communicatively coupled with the distributed datastore, wherein the computing hardware device comprises a second non-transitory data storage medium storing a second set of instructions which, when executed by the computing hardware device, cause:
receiving the posted device control data from the distributed datastore including distributed ledger and blockchain data repository;
using the posted device control data received from the distributed datastore including distributed ledger and blockchain data repository, remotely managing user accounts and access control and security policies on at least one networked device.

16. The computer system of claim 15, wherein remotely managing comprises transmitting the device control data to the at least one networked device.

17. The computer system of claim 16, wherein transmitting the device control data comprises using HTTP, Real Time Streaming Protocol (RTSP) over HTTP, Secure Socket Shell (SSH), Telnet, or Windows Remote Management (WinRM).

18. The computer system of claim 15, wherein the computing hardware device is configured with gateway functionalities.

19. The computer system of claim 15, wherein the device control data includes user accounts and access control and security policies.

20. The computer system of claim 16, further comprising a plurality of networked devices, wherein the plurality of networked devices is synchronized with the posted device control data in the distributed datastore including distributed ledger and blockchain data repository.

* * * * *